Patented May 3, 1932

1,856,567

UNITED STATES PATENT OFFICE

THEODOR KLEINERT AND KURT TAYENTHAL, OF VIENNA, AUSTRIA

PROCESS OF DECOMPOSING VEGETABLE FIBROUS MATTER FOR THE PURPOSE OF THE SIMULTANEOUS RECOVERY BOTH OF THE CELLULOSE AND OF THE INCRUSTING INGREDIENTS

No Drawing. Application filed October 29, 1930, Serial No. 492,082, and in Austria November 2, 1929.

This invention relates to a new and improved process of decomposing vegetable fibrous matter for the purpose of the simultaneous recovery both of the cellulose and of the incrusting ingredients.

There are already processes known for the decomposition of lignified vegetable matter all of which aim principally at a high yield of cellulose, while no importance is attached to the recovery of the decomposing agents nor to the extraction of the incrusting ingredients.

Thus the attempt has been made, among others, to decompose vegetable matter by the treatment of the same in the dry state with anhydrous monovalent or multivalent alcohol. It has further been proposed for the same purpose to employ multivalent alcohol at a raised temperature and, if need be, under pressure. It is also a known fact that water alone or with a slight admixture of alcohol has, at normal and raised temperatures, a slightly solvent effect upon the incrusting ingredients of wood and other vegetable fibrous matter. It is also known, since the publishing of the work of P. Klason and O. Fagerlind (Arkiv for kemi 3.N.6, 1908) that the consecutive treatment of spruce with water and alcohol is capable of yielding lignin-like substances to the extent of 2%.

In contrast to these known methods the present invention consists essentially in the employment, as decomposing agent, of mixtures of alcohol and water with a water content of 20% to 75% under pressure and at temperatures over 150° C. This mixture of water and alcohol, particularly when ethyl alcohol is used, exercises, at temperatures over 150° C. and at appropriately high pressure, a powerfully decomposing effect upon such vegetable matter as consists principally of cellulose in addition to lignin and other incrusting ingredients, in particular therefore upon the different kinds of wood and grass. This effect is attributable in a high degree to the employment of the mixtures named, the components of these mixtures when employed separately or consecutively being in practise unsuitable for the purpose of decomposition.

Thus in accordance with the invention cellulose can be recovered from fibrous vegetable matter by means of simple technical expedients, while at the same time the incrusting ingredients, such as lignin, resin, carbohydrates, etc., can also be obtained. The decomposing agents are recoverable by simple distillation.

It is thus possible, for instance, by heating spruce sawdust with a mixture of 30% ethyl alcohol in water (specific gravity 0.957) to 205° C., to obtain a yield of cellulose almost free of lignin and amounting to 50% of the dry raw material. A test made under the same conditions but with 96% alcohol yields a dark brown residue amounting to 92% of the raw material, while with water alone the material becomes tarred and coloured blackish brown, and at the same time the cellulose is powerfully attacked.

The decomposing temperature and the composition of the mixtures of water and alcohol employed can be altered within certain limits without influencing the result obtained. A preliminary treatment of the material to be decomposed, as for example by boiling with water or diluted alkalies, has only a slight effect. On the other hand the decomposition can be powerfully influenced by the addition of slight quantities of acid or basic substances. The breaking down of the cellulose-lignin complex is favoured by increasing the concentration of the hydrogen ions and delayed by increasing the concentration of the hydroxyl ions, which latter can be achieved by the addition of substances of an acid or basic reaction. The delaying of the breaking-down action of the decomposing agent can be of importance for the process of decomposition, since time is thereby given for the thorough removal of the incrusting ingredients from the fibre before secondary reactions of a disturbing nature can occur.

Apart from the mixtures of ethyl alcohol and water mixtures of water with methyl alcohol and its homologous substances, or with multivalent alcohols such as glycerine, in the proportions given, have a similar decomposing effect.

From the raw materials mentioned at the outset there can be produced by decomposition with the given mixtures of water and alcohol at the required pressure and temperature raw cellulose substances containing very slight residual traces of lignin and other incrusting ingredients, and capable of being freed of these traces by any one of the known finishing or bleaching processes.

The incrusting ingredients, including lignin and the sugar resulting from the decomposition, are extracted from the raw material by the decomposing agent, and can be removed from the extracts by the driving off of the alcohol. They are neither destroyed nor adulterated by chemicals and can therefore be worked up subsequently in any desired manner.

A particular advantage of the decomposing process according to the present invention is that no chemicals are used up, since the alcohol is not consumed and can always be recovered. The cellulose and paper industry is thus rendered independent of the importation of expensive subsidiary materials which are for the most part not of inland origin, such as for example the iron-pyrites required for the sulphite cellulose process at present most generally practised.

Injurous waste-water, the disposal of which constitutes a perpetual difficulty and cause of embarrassment to all processes of decomposition at present carried out on a factory scale, is not given off at all by the process provided by the present invention.

The new process is applicable to the most various kinds of vegetable matter, provided the same be sufficiently rich in cellulose. For example, the waste woody matter derived from the dyeing and tanning industries, which could hitherto be turned to no account, can be made use of for the purposes of the process provided by the present invention.

A practical example of the carrying out of the above-described process would be the following:—

Wood chips are mixed with ten times their weight of a 50% mixture of alcohol and water and heated in a pressure chamber, the decomposing agent being renewed in the course of the process in a known manner. During the first three hours the temperature should preferably not exceed 180° C. After the renewal of the decomposing agent the temperature is raised for a further three hours, but must not exceed a maximum temperature of 210° C. During this period the decomposing agent is renewed several times, in order to remove the extracted substances rapidly from the pressure chamber. After the conclusion of the heating period the plan is allowed to cool off. The mixture of alcohol and water remaining in the pressure chamber is displaced by means of water.

The raw cellulose obtained in this manner is well adapted for ravelling and bleaching.

The alcohol employed in the course of decomposition can be recovered by simple distillation. The lignin and other extracted substances, including the sugar formed during decomposition, are contained in the residue.

We claim:—

1. A process for the decomposition of fiber-containing plants, portions of plants, woods, and other similar matter, for the purpose of obtaining simultaneously therefrom both the cellulose and the incrusting ingredients contained therein, which consists in submitting the said matter to the action of a mixture of alcohol and water having a water content amounting to between 20% and 75% of the said mixture, under pressure, and at a temperature in excess of 150 degrees centigrade.

2. A process as claimed in claim 1, whereby the said mixture is repeatedly renewed during the course of the said process.

3. A process for the decomposition of fiber-containing plants, portions of plants, woods, and other similar matter, which consists in submitting the said matter to the action of alcohol and water having a water content amounting to between 20% and 75% of the said mixture, under pressure, and at a temperature exceeding 150 degrees centigrade, substances of an acid reaction being added to the said decomposing agent to an extent amounting to less than 0.1%, for the purpose of influencing the concentration of the hydrogen ions.

4. A process as claimed in claim 3, wherein the said alcohol is of the monovalent order.

5. A process as claimed in claim 3 in which the said alcohol is a mixture of alcohols of the monovalent order.

6. A process for the decomposition of fiber-containing plants, portions of plants, woods, and other similar matter, which consists in submitting the said matter to the action of a decomposing agent consisting of a mixture of alcohol and water having a water content amounting to between 20% and 75% of the said mixture, under pressure, and at a temperature exceeding 150 degrees centigrade, substances of a basic reaction being added to the said decomposing agent to an extent amounting to less than 0.1%, for the purpose of influencing the concentration of the hydrogen ions.

7. A process as claimed in claim 6 in which the said alcohol is of the monovalent order.

8. A process as claimed in claim 6 in which the said alcohol is a mixture of alcohols of the monovalent order.

The foregoing specification signed at Vienna, Austria, this eighteenth day of October, 1930.

THEODOR KLEINERT.
KURT TAYENTHAL.